April 21, 1925.  
M. A. J. HARPER  
1,534,949  
CINEMATOGRAPHIC APPARATUS  
Filed Aug. 10, 1921

Martin Albert John Harper INVENTOR
by Frank P. Wentworth
his Attorney.

Patented Apr. 21, 1925.

1,534,949

UNITED STATES PATENT OFFICE.

MARTIN ALBERT JOHN HARPER, OF LONDON, ENGLAND.

CINEMATOGRAPHIC APPARATUS.

Application filed August 10, 1921. Serial No. 491,087.

*To all whom it may concern:*

Be known that I, MARTIN ALBERT JOHN HARPER, a subject of His Majesty the King of Great Britain, residing at 2 St. Stephens Square, Bayswater, London, W., England, have invented certain new and useful Improvements in or Relating to Cinematographic Apparatus, of which the following is a specification, reference being had thereto in to the accompanying drawing.

This invention relates to cinematographic apparatus of the kind in which light concentrated on an opaque film is reflected therefrom through the projecting lens onto the screen, and has for its chief object to provide improved apparatus of this kind whereby the pictorial image thus projected onto the screen will be brilliant and evenly illuminated and entirely free from any image of the illuminant.

According to my invention, I concentrate a beam or pencil of light on the opaque film by means of an optical system comprising an illuminant, such for example as an incandescing filament electric lamp filled with an inert gas; a spherical reflector behind the same; a condenser in front of the illuminant; and a bi-convex lens in front of the condenser at about its focal point; these elements of the optical system being arranged in any suitable manner so as to be relatively adjustable for focussing purposes. By means of this optical system I produce by suitable focussing a brilliant and evenly illuminated patch of light on the film free from any image of the illuminant; and by so arranging the optical system that the beam of light falls obliquely on the film, an oval patch of light is produced thereon which will readily cover the standard sized picture (1"x¾") although the diameter of the incident beam of light may be less than the diagonal of the picture.

If considered desirable, two oblique beams of light may be directed onto the picture to be reflected, the beams being preferably oppositely and symmetrically disposed and the apparatus used for originating each beam of light being of similar construction.

Since opaque films cannot be turned back to front as can transparent films, I may avoid the necessity for reverse printing of the opaque film in order to obtain a correct side-for-side presentation of the picture projected onto the screen, by the use of a reversing prism in conjunction with the above described optical system, through which prism the light rays reflected from the opaque film pass onto the screen. The said prism may be arranged either between the opaque film and the projecting lens, or between the said lens and the screen which latter would preferably be in a plane at right angles to that of the film.

To avoid loss of light which may occur owing to emergence of light rays through the reflecting surface of the prism, I prefer to silver the said reflecting surface, or apply a suitable reflecting medium thereto.

I will now describe a manner of carrying my invention into effect having reference to the annexed drawings in which similar reference numerals refer to corresponding parts in all the figures, and wherein:—

Figure 1:
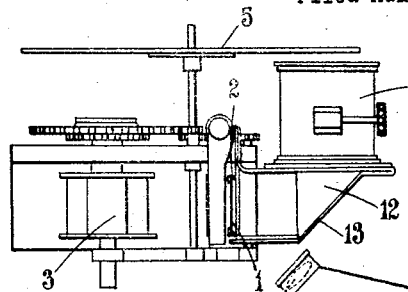
Fig. 1 is a more or less diagrammatic plan view showing cinematographic apparatus in accordance with my invention. Parts not necessary for the proper comprehension of the invention are omitted.

1 is the opaque film to which intermittent motion may be imparted in the customary or any suitable manner. 2 is the usual gate, 3 a feed sprocket, 4 the projecting lens and 5 the shutter, all of which may be of the ordinary or suitable construction.

A is the optical system for concentrating a beam or pencil of light upon the opaque film and producing a brilliant and evenly illuminated patch of light free from image of the illuminant on the picture to be reflected.

This optical system comprises a suitable box or casing 6 containing the illuminant which may conveniently consist of an electric lamp of the type comprising a bulb 7 filled with an inert gas and having suitable incandescing filaments 8 therein; a spherical reflector 9, a condenser 10; and a bi-convex lens 11 at about the focal point of the condenser. The said illuminant, reflector, condenser and lens are arranged in any suitable manner so as to be relatively adjustable for focussing purposes. The filaments 8 shown are of the known type consisting of spaced parallel spiral filament coils.

Figure 2:
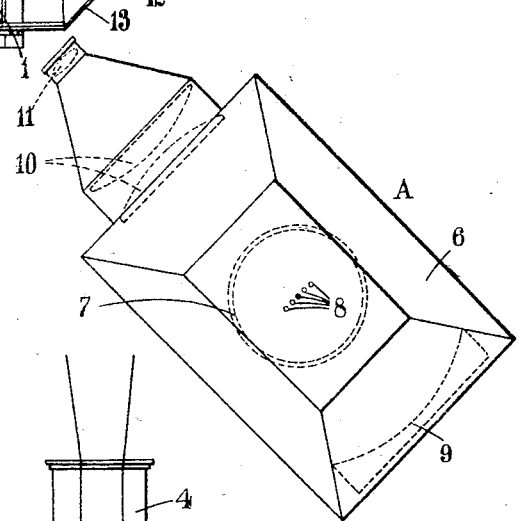
Figs. 2 and 3 are diagrams showing alternative arrangements of the reversing prism.
Figure 2:
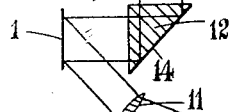

As will be seen clearly in Fig. 2 the said optical system is so arranged as to concentrate a beam of light obliquely on the film 1, and produce thereon an oval patch of light which will readily cover the standard size picture, although the diameter of the incident pencil of light may be less than the diagonal of the picture. The film 1 should be at such a distance from the lens 11 that the oblique beam of light will just cover a picture of the film, but the film must not be at the image point of said lens since the function of the latter is not to form an image but to produce a patch of uniform light free from any image.

The lamp is focussed so as to bring both its anterior and posterior rays to a focus on a temporary screen; as by removing or obscuring the reflector 9, removing the lens 11, and focussing the anterior light rays on a card or like temporary screen, placed at about the position of the lens 11, so as to form an image of the filaments 8 thereon; then placing the spherical reflector in position and adjusting it so as to bring the posterior rays to a focus on the card, forming a co-equal image of the filaments 8 thereon interlaced with or superposed upon the image of the filaments formed by the anterior rays. The bi-convex lens 11 is then fitted into place and an evenly illuminated patch of light will then be formed on the picture to be projected by reflection, and since the film 1 is not at the image point of the lens 11 the said patch of uniform light will be free from any image of the illuminant, and the picture when projected on the screen by the usual projection lens 1 will be clearly defined thereon.

Referring to Figs. 1 and 2, 12 is a reversing prism mounted in a suitable carrier 13 behind the projecting lens 4, between the latter and the film, so that the light rays reflected from the film 1 will enter this prism and be deflected thereby through the projecting lens 4, as clearly seen in Fig. 2.

Figure 3:
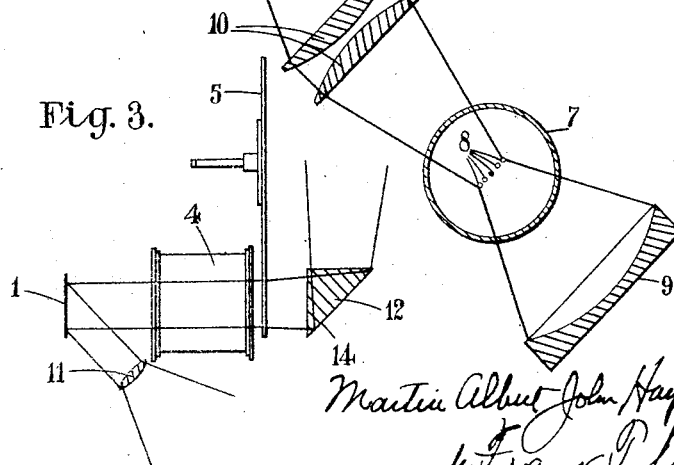

Or, alternatively, the said prism may be suitably mounted in front of the projecting lens 4 between the latter and the screen as shown in the diagram Fig. 3, instead of behind the projecting lens as above described. In both arrangements the function of the prism 12 is to reverse the image projected onto the screen, thus giving a correct side-for-side presentation of the picture on the latter.

The reflecting surface 14 of the prism is preferably silvered, or has a suitable reflecting medium applied thereto, to avoid loss of light by emergence of light rays through the said reflecting surface.

I am aware that an optical system comprising an illuminant, a spherical reflector, a condenser, and a bi-convex lens at about the focal point of the latter, is not novel, per se, but so far as I am aware such an optical combination has not been heretofore used in accordance with the provisions of these improvements and for the production of a brilliant and evenly illuminated patch of light on an opaque film in cinematographic apparatus.

What I claim and desire to secure by Letters Patent of the United States is:—

1. In a cinematographic apparatus of the character described, the combination with means for feeding an opaque film and a projecting lens, of an optical system embodying therein a lamp having a plurality of spaced filaments, a condenser, a bi-convex lens positioned at about the focal point of the condenser and between said condenser and the feeding means for the film the relative position of said bi-convex lens and said feeding means being such as to bring a film upon said means where it will not be at the image point of said lens, and a spherical reflector positioned with relation to said lamp on the side thereof opposite to said condenser and so adjusted as to reflect the image of the filaments of the lamp through the spaces between or about said filaments, whereby a uniform patch of light free from the image of said filaments is directed against the opaque film.

2. In a cinematographic apparatus of the character described, the combination with means for feeding an opaque film and a projecting lens, of an optical system embodying therein a lamp having a plurality of spaced filaments, a condenser, a bi-convex lens positioned at about the focal point of the condenser and between said condenser and the feeding means for the film the relative position of said bi-convex lens and said feeding means being such as to bring a film upon said means where it will not be at the image point of said lens, a reversing prism arranged in the path of the light rays passing from the film to the screen, and a spherical reflector positioned with relation to said lamp on the side thereof opposite to said condenser and so adjusted as to reflect the image of the filaments of the lamp through the spaces between or about said filaments, whereby a uniform patch of light free from the image of said filaments is directed against the opaque film.

3. In a cinematographic apparatus of the character described, the combination with means for feeding an opaque film and a projecting lens, of an optical system embodying therein a lamp having a plurality of spaced filaments, a condenser, a bi-convex lens positioned at about the focal point of the condenser and between said condenser and the feeding means for the film the relative position of said bi-convex lens and said feeding means being such as to bring a film upon said means where it will not be at the image point of said lens, a reversing prism having a reflecting surface provided with a reflecting medium, arranged in the path of the light rays passing from the film to the screen, and a spherical reflector positioned with relation to said lamp on the side thereof opposite to said condenser and so adjusted as to reflect the image of the filaments of the lamp through the spaces between or about said filaments, whereby a uniform patch of light free from the image of said filaments is directed against the opaque film.

In testimony whereof I have signed my name in the presence of two subscribing witnesses.

MARTIN ALBERT JOHN HARPER.

Witnesses:
  ALBERT EDGAR ALEXANDER,
  CECILIA WINIFRED ROWEDDER.